(12) United States Patent
Joong

(10) Patent No.: US 6,549,776 B1
(45) Date of Patent: Apr. 15, 2003

(54) SYSTEM, METHOD, AND APPARATUS FOR PUSHING DATA IN A DIRECT DIGITAL CALL ENVIRONMENT

(75) Inventor: Donald Joong, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/365,137

(22) Filed: Jul. 30, 1999

(51) Int. Cl.⁷ .................................................. H04Q 7/22
(52) U.S. Cl. ...................... 455/433; 455/426; 370/467
(58) Field of Search ................................. 455/414, 422, 455/433, 556, 426, 466, 435, 445; 370/352, 389, 465, 466, 467, 338, 401, 349, 354; 709/206, 219

(56) References Cited

U.S. PATENT DOCUMENTS

| | | | |
|---|---|---|---|
| 5,457,680 A | | 10/1995 | Kamm et al. .................. 370/17 |
| 5,590,133 A | * | 12/1996 | Billstrom et al. ........... 370/332 |
| 5,793,762 A | * | 8/1998 | Penners et al. ............. 370/352 |
| 5,905,719 A | * | 5/1999 | Arnold et al. .............. 370/330 |
| 5,943,399 A | * | 8/1999 | Bannister et al. ........... 370/493 |
| 6,061,346 A | * | 5/2000 | Nordman ..................... 370/352 |
| 6,075,783 A | * | 6/2000 | Voit ......................... 370/352 |
| 6,088,340 A | * | 7/2000 | Buchholz et al. ........... 370/310 |
| 6,101,189 A | * | 8/2000 | Tsuruoka .................... 370/401 |
| 6,125,281 A | * | 9/2000 | Wells et al. ................. 455/414 |
| 6,181,935 B1 | * | 1/2001 | Gossman et al. ........... 455/432 |
| 6,185,208 B1 | * | 2/2001 | Liao ......................... 370/392 |
| 6,222,829 B1 | * | 4/2001 | Karlsson et al. ............. 370/329 |
| 6,243,581 B1 | * | 6/2001 | Jawanda ..................... 455/432 |
| 6,272,129 B1 | * | 8/2001 | Dynarski et al. ............ 370/356 |
| 6,308,267 B1 | * | 10/2001 | Gremmelmaier ............ 370/329 |
| 6,314,108 B1 | * | 11/2001 | Ramasubramani et al. . 370/401 |
| 6,317,609 B1 | * | 11/2001 | Alperovich et al. .......... 455/15 |
| 6,321,257 B1 | * | 11/2001 | Kotola et al. ............... 455/422 |
| 6,356,529 B1 | * | 3/2002 | Zarom ........................ 370/231 |

FOREIGN PATENT DOCUMENTS

| | | |
|---|---|---|
| EP | 1 003 315 | 5/2000 |
| WO | WO 99/14910 | 3/1999 |
| WO | WO 99/29083 | 6/1999 |
| WO | WO 99/33250 | 7/1999 |
| WO | WO 00/33523 | 6/2000 |
| WO | WO 00/44149 | 7/2000 |
| WO | WO 00/46963 | 8/2000 |
| WO | WO 00/51364 | 8/2000 |

OTHER PUBLICATIONS

International Search Report, PCT/SE00/01517, dated Dec. 19, 2000.

* cited by examiner

Primary Examiner—Nay Maung
Assistant Examiner—Jean A Gelin
(74) Attorney, Agent, or Firm—Jenkens & Gilchrist, P.C.

(57) ABSTRACT

A system, method, and apparatus for transmitting a packet from a server to a wireless client, using direct digital calls, wherein the server initiates the call are presented. The server transmits a packet to addressed to an Internet Protocol (IP) address associated with the wireless client. The packet is received by a wireless application gateway which maintains a table correlating IP addresses with mobile services integrated services digital network (MSISDN) numbers or mobile identification numbers (MIN). The MSISDN/MIN number is then used to request routing information. In response to the request, a dynamic IP address and a traffic channel are allocated to the wireless client. The dynamic IP address is transmitted to the wireless application protocol gateway. Upon receiving the IP address, the wireless application protocol gateway transmits the digital data communication towards the IP address. The digital data communication is received by a serving mobile switching center which causes the digital data communication to be transmitted to the wireless client using the allocated traffic channel.

25 Claims, 2 Drawing Sheets

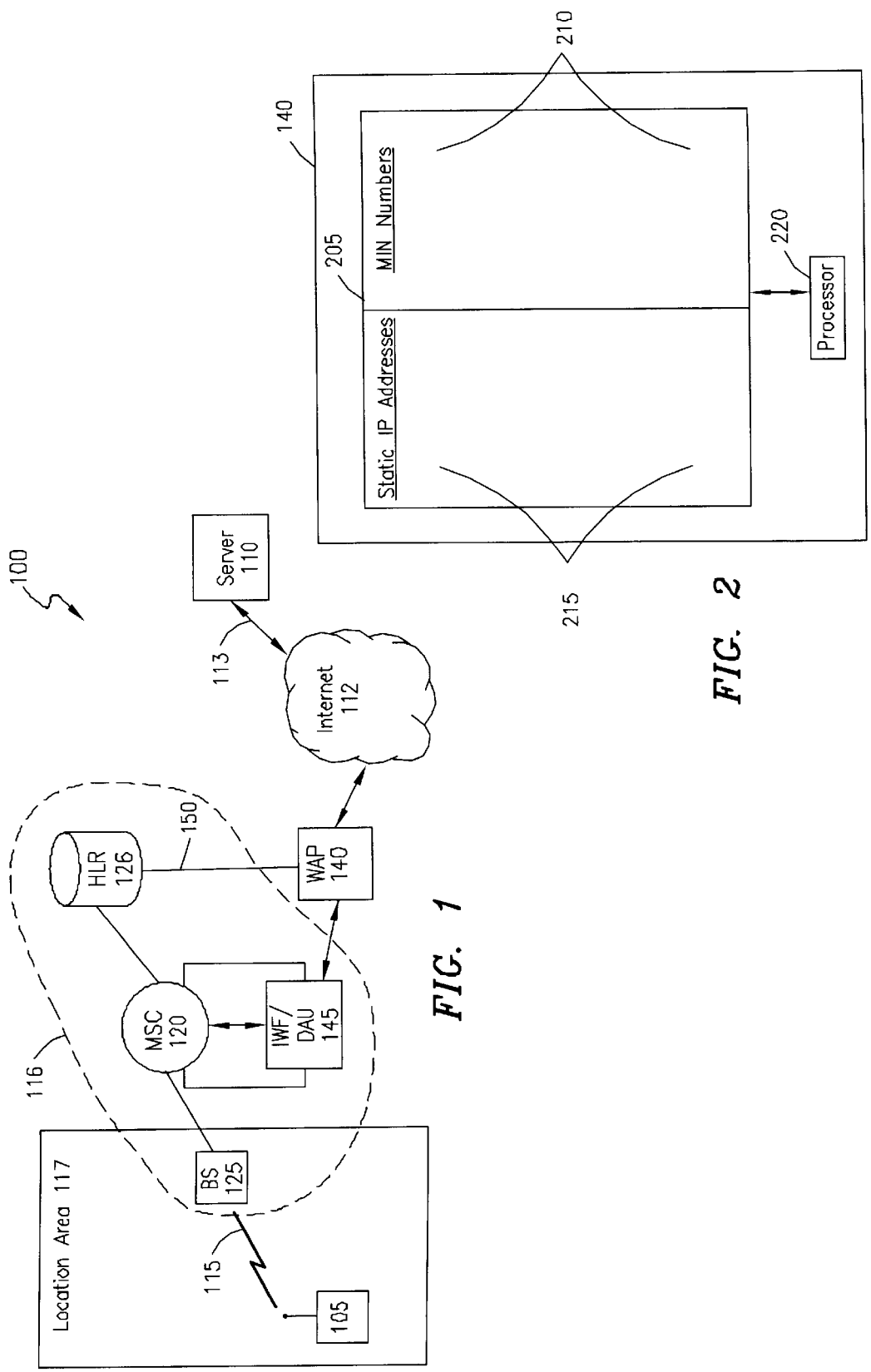

SYSTEM, METHOD, AND APPARATUS FOR PUSHING DATA IN A DIRECT DIGITAL CALL ENVIRONMENT

BACKGROUND OF THE INVENTION

1. Technical Field of the Invention

The present invention relates to telecommunications, and more particularly, to wireless data communications.

2. Description of Related Art

Advances in microelectronic technology have provided numerous portable computer-like devices. Portable computer-like devices include, for example, Personal Digital Assistants (PDA), Handheld Personal Computers (HPC), and smart phones.

A PDA is a handheld device which acts like an electronic organizer or diary. Among the functions performed by a PDA include small scale database applications, word processing, and appointment scheduling. A handheld personal computer, often referred to as a "palm top" provides personal computing in a handheld device. A smart phone is a microcontroller-controlled electronic telephone with a touch sensitive screen that interactively allows a user to place a call, send E-mail, and perform certain financial transactions.

Each of the foregoing devices provide a user with computer-like functions. However, in contrast to desktop computers, the foregoing devices are portable, thereby permitting a user to be mobile. Additionally, with advances in cellular telecommunications, the functions of the foregoing devices are expanded to client/server applications as well.

Computer systems are often connected to another computer system, typically a server, to form a computer network. When networked together, communication between the separate computer systems is possible. A server is a class of shared computers that are used to handle service common to all connected computers, known as clients. A common use of the server also includes handling and maintaining databases, and controlling access to voice mail, E-mail, or facsimile. Performing the foregoing functions at a server is advantageous because the same functions can be accessed from any of the clients which can be located about a large geographic area. Additionally, the functions can be simultaneously accessed by more than one client.

Clients often access servers using a wireline connection, such as through the public switched telephone network or a coaxial cable. However, advances in cellular telecommunications technology now allow clients to access servers using the mobile air interface. Because a wireline connection is no longer required, handheld computer-like devices can access server functions without restricting the user's mobility. A computer, or computer-like device accessing a server using the air interface is known as a wireless client.

When a client/server connection is established, any information to be transmitted must be formatted in a manner suitable for transmission. Additionally, information regarding various transmission parameters, such as the speed, ready to send signals, and ready to receive signals, must also be formatted and transmitted. Furthermore, the format of the information, as well as the convention for communicating the transmission parameters, must be known to the client or server receiving the transmission. The foregoing is accomplished using what is known in the art as a protocol. A protocol is a specific set of rules, procedures or conventions relating to the format and timing of data transmission. By establishing a common protocol between the client and server, information can be transmitted in a reliable manner understandable to both the client and the server.

The Wireless Application Protocol (WAP) was created to optimize data communication with wireless clients. Ideally, the WAP based service should be used on top of a packet switched transport such as Cellular Digital Packet Data (CDPD) or General Packet Radio Service (GPRS). However, due to standardization delays and the prohibitive cost of deploying a new packet radio service, operators are looking at other transports to offer WAP based service.

Another transport that has been considered is direct digital cellular circuit switched data calls (direct digital calls). Unlike conventional data calls which require a latency time for modem synchronization, direct digital calls do not involve any modems and therefore can be easily established and torn down as needed. The foregoing is ideal for many client/server and Internet applications which communicate in transmission bursts.

Applications which communicate in transmission bursts are characterized by very short periods of high data rate transmission, followed by longer periods of inactivity. Transmission in bursts is advantageous because the communication channel need only be maintained during the very short periods of transmission and can be torn down during the longer periods of inactivity.

The greatest limitation for using direct digital calls for a WAP based application is the fact that direct digital calls can only be used when the client originates the call to the server. The foregoing limitation is known in the art as an information pull model. The information pull model is a significant limitation for notification service applications, such as E-mail, stock price alert, and security alert, to name a few, where it is desirable for the server to notify the client of a particular event in a real-time fashion. A system where a server initiates a communication to the client and forwards information is known in the art as an information push model.

Accordingly, it would be advantageous if the server is able to push information to a wireless client in a direct digital call environment.

SUMMARY OF THE INVENTION

The present invention is directed to a system, method, and apparatus for transmitting a digital data communication from a server to a wireless client, wherein the server initiates a call to push information to the client. A wireless application protocol gateway is interfaced by means of a signal link to a home location register of a cellular telecommunications system. The signal link permits the WAP Gateway to query the home location register for routing information needed to deliver a call with push information to the wireless client using the infrastructure of the cellular telecommunications system.

The present invention is also directed to a wireless application protocol gateway for routing a digital data communication from a server to a wireless client, wherein the server initiates a call to the client. The wireless application protocol gateway maintains a table that correlates Internet Protocol (IP) addresses with Mobile Services Integrated Services Digital Network (MSISDN) numbers or Mobile Identification Numbers (MIN) of the wireless clients. When the wireless application protocol gateway receives a digital data communication addressed to a particular IP address, the wireless application protocol gateway determines the corresponding MSISDN number of the wireless client. The MSISDN number can then be used to initiate an incoming call to the wireless client using the infrastructure of the cellular radio system.

The present invention is also directed to a method for transmitting a digital data communication from a server to a wireless client, wherein the server initiates an incoming call to the client. When a digital data communication is received at a wireless application protocol gateway, the wireless application gateway queries a database storing location information for the wireless client. In response to the query, a dynamic IP address is allocated to the wireless client and transmitted to the wireless application protocol gateway. The wireless application protocol gateway then transmits the digital data communication using the dynamic IP address as a destination address.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 1 is a block diagram of a telecommunications system wherein the present invention can be practiced;

FIG. 2 is a block diagram of a Wireless Application Protocol (WAP) gateway configured in accordance with the present invention.

DETAILED DESCRIPTION OF THE PREFERRED EXEMPLARY EMBODIMENTS

Figure 3:
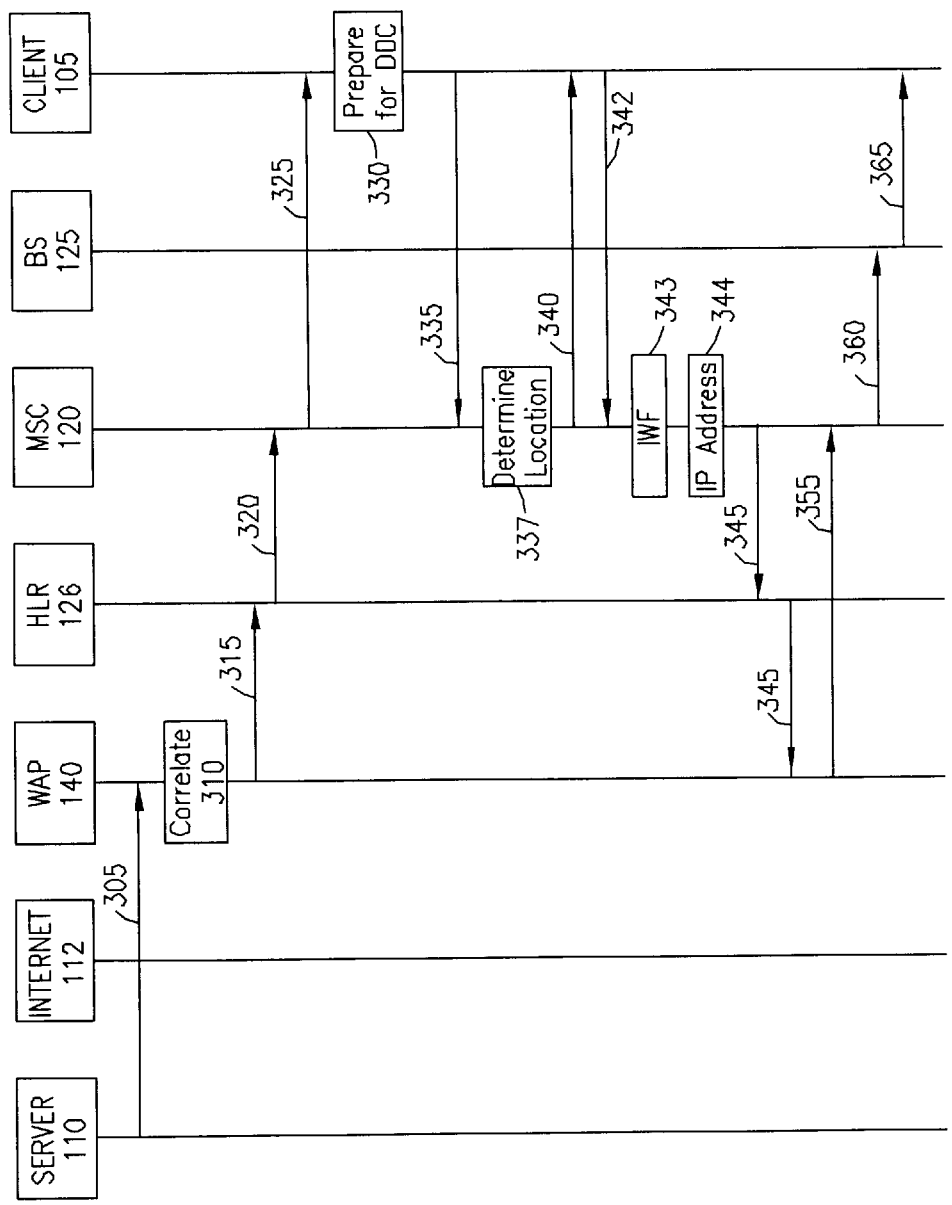
FIG. 3 is a signal flow diagram describing the operation of the telecommunications system of FIG. 1 in accordance with the present invention.

Referring now to FIG. 1, there is illustrated a block diagram of an exemplary telecommunications system, referred to generally by the numeral 100, configured in accordance with the principles of the present invention. The telecommunications system includes a wireless client 105 which can establish a client/server connection with a server 110 and vice versa. Although servers 110 are accessible over a direct link, such as a Local Area Network (LAN), servers 110 are commonly accessed over the Internet 112 via an Internet connection 113. A server 110 with an Internet connection 113 can then be accessed by clients 105 with Internet 112 access anywhere in the world.

The wireless client 105 can include a computer, or computer like system capable of establishing a communication link 115 over the air interface. The communication link 115 over the air interface is often supported by a cellular telephone network 116. The cellular telephone network 116 includes at least one area 117 served by a Mobile Switching Center (MSC) 120. The MSC 120 is in communication with at least one Base Station 125. The base station 125 is the physical equipment that provides radio coverage to a particular geographical portion (known as a cell) of the area 117.

The MSC 120 is associated with a Home Location Register (HLR) 126, which is a database maintaining and storing subscriber information such as subscriber profiles, current location information, International Mobile Subscriber Identity (IMSI) numbers, and other administrative information. The subscriber services associated with the wireless client 105 are defined in a subscriber profile that is stored in the HLR 126. The subscriber profile identifies wireless clients 105 using Mobile Station Integrated Services Digital Network (MSISDN) numbers. The HLR 126 may be co-located with a given MSC 120, integrated with the MSC 120, or alternatively can service multiple MSCs 120.

The Wireless Application Protocol (WAP) was established to optimize data communications with wireless clients 105. However, a large portion of Internet 112 traffic is communicated pursuant to the hypertext transmission protocol (HTTP) using Internet Protocol (IP) addresses. In accordance with the WAP, the wireless client 105 accesses the Internet 112 via a WAP gateway 140. The WAP gateway 140 receives data communications over the Internet 112 in HTTP format, translates the data communications to WAP format, and forwards the translated data communications in WAP format to the wireless client 105. Likewise, the WAP gateway 140 receives data communications from the wireless client 105 in WAP format, translates the data communications to HTTP format, and forwards the translated data communications to the Internet 112.

The WAP protocol can be used on top of the packet switched transport, direct digital cellular circuit switched data calls (direct digital calls). Unlike conventional data calls which would require a latency time for modem synchronization, direct digital calls do not involve any modems and therefore can be easily established and torn down as needed. The wireless client 105 establishes a direct digital call through an InterWorking Function/Direct Access Unit (IWF/DAU) 145 at the MSC 120. The IWF/DAU 145 terminates the radio interface and provides access to a Direct Access Unit (DAU) 150. The DAU 150 functions as a router and routes data between the WAP gateway 145 and the wireless client 105. Additionally, the IWF/DAU 145 is equipped with a timer that tears down the direct digital call after a predetermined period of inactivity.

Direct Digital Calls are advantageous for applications which communicate in bursts. During the period of high data rate transmission, a communication channel, including communication link 115 between the wireless client 105 and She WAP gateway is maintained. However, during the period of inactivity, the communication channel, e.g., the communication link 115 can be torn down.

An information pull model refers to a system where the wireless client 105 is the calling party in a direct digital call. Numerous applications, such as E-mail, stock price alert, and security alert use an information push model where the server 110 contacts the wireless client 105 in a real-time fashion, responsive to the occurrence of a particular event.

To permit the server 110 to contact the wireless client 105, the present invention proposes interfacing the WAP gateway, 140 to the cellular radio telecommunications network, thereby permitting the WAP gateway to initiate calls to the wireless client 105. The WAP gateway 140 is interfaced to the cellular telephone network by means of a signal link 150 connecting the WAP gateway to the HLR 126. The WAP gateway 140 uses the signal link 150 to query the HLR 126 and route incoming calls to the wireless client 105 as will be described below.

Referring now to FIG. 2, there is illustrated a block diagram of an exemplary WAP gateway 140 in accordance with the present invention. The WAP gateway 140 maintains a table 205 correlating the mobile station integrated service digital network (MSISDN) numbers 210 associated with each wireless client 105 to static IP addresses 215 for the clients. Alternatively, the WAP gateway 140 can maintain a table 205 correlating the mobile identification numbers (MIN) 210 associated with each wireless client 105 to the IP addresses 215 for the clients. Those skilled in the art will recognize that the IP addresses can be assigned when a subscriber at a wireless client 105 initially registers for Internet access. The IP addresses assigned to subscribers during initial registration are known as static IP addresses. A server 110 contacting a wireless client 105 sends a communication to the static IP address corresponding to the wireless client 105. The communication is received over the Internet 112 by the WAP gateway 140. A processor 220 within the WAP gateway 140 looks up the static IP address 215 in the table 205 and determine the MSISDN 210 number associated therewith. The WAP gateway 140 uses the MSISDN 210 associated with the static IP address 215 to query the HLR 126 via signal link 150 and set up a call to the wireless client 105 as will be described below.

Referring now to FIG. 3, there is illustrated a signal flow diagram describing the operation of the telecommunications system of FIG. 1 in accordance with the present invention. The server 110 contacts the wireless client 105 by addressing a communication to the static IP address corresponding with MSISDN of the wireless client 105, and sending the communication (signal 305) to the WAP Gateway 140 via the Internet 112. The WAP gateway 140 receives the communication (signal 305) and determines the MSISDN corresponding the received static IP address (action 310).

The WAP gateway 140 uses the determined MSISDN to transmit a location request (signal 315) to the HLR 126 to determine the MSC/VLR location area 117 and the MSC 120 serving the wireless client 105. The location request (signal 315) includes a parameter identifying the call as a direct digital call from a WAP gateway 140. The HLR 126 determines the MSC/VLR location area 117 and the serving MSC 120, and transmits a routing request (signal 320) from the HLR to the serving MSC 120 that includes the parameter identifying the call as a direct digital call.

The serving MSC 120 determines, to some selected degree of granularity, the location of the wireless client 105 by paging (signal 325) the wireless client having the identified MSISDN. The paging signal (signal 325) includes the parameter identifying the call as a direct digital call from a WAP gateway 140, thereby permitting the wireless client 105 to take appropriate actions (action 330), such as setting up the requisite WAP stack. The wireless client 105 responds by transmitting a page acknowledgment to the MSC 120 (signal 335). The serving MSC 120 uses the acknowledgment (signal 335) to determine the location of the wireless client 105 (signal 337) and the serving base station 125. The MSC 120 then directs the serving base station 125 to allocate a traffic channel to the wireless client 105 (signal 340) to which the client replies with an acknowledgment (signal 342).

Additionally, the MSC 120 uses the IWF/DAU 145 to establish (action 343) a communication link with the WAP gateway 140 and allocates (action 344) a dynamic IP address/port number to the call and the traffic channel associated therewith by the base station in signal 340. The IP address/port number allocated to the call is considered dynamic because the IP address/port number is temporarily allocated for the duration of the direct digital call, and at the conclusion of the direct digital call, the IP address/port number is deallocated and available for reallocation for another direct digital call.

The serving MSC 120 transmits a route request return result message (signal 345) to the HLR 126 which includes the dynamically allocated IP address/port number allocated during action 344. The HLR 126 transmits a location request return message (signal 350) to the WAP gateway 140. Upon receiving the IP address/port number from the location request return message (signal 350), the WAP gateway 140 pushes the communication (signal 355) towards the dynamic IP address/port number, thereby causing the communication to be routed to the IWF/DAU 145 at the MSC 120. Because the dynamic IP address/port number identifies the channel, the MSC 120 forwards the communication (signal 360) to the serving base station 125 determined during action 337. The serving base station 125 then transmits (signal 365) the communication to the wireless client 105 over the air interface using the traffic channel previously allocated.

Although the invention has been described with a certain degree of particularity, it should be recognized that elements thereof may be altered by persons skilled in the art without departing from the spirit and scope of the invention. For example, although the description contained herein depicts embodiments of the invention in a GSM environment, it should be understood that other embodiments of the invention can practiced in other telecommunication network environments. Therefore, the invention is limited only by the following claims and their equivalents.

What is claimed is:

1. A mobile telecommunications system, said mobile telecommunication system comprising:
   a wireless application protocol gateway for receiving a digital data communication associated with an Internet Protocol address from an Internet server in a certain format and converting said certain format and said Internet Protocol address of said digital data communication to a wireless application protocol format associated with a mobile telecommunications system number of a wireless client, wherein said wireless application protocol gateway comprises:
      a first memory for storing a plurality of static Internet Protocol addresses, said plurality of Internet Protocol addresses including said Internet Protocol address associated with said digital data communications;
      a second memory for storing a plurality of mobile telecommunications system numbers, said plurality of mobile telecommunications system numbers including said mobile telecommunications system number associated with said wireless client, and wherein each of said mobile telecommunications system numbers is associated with a particular one of said plurality of Internet Protocol addresses; and
      a processor for selecting the mobile telecommunications system number based on the Internet Protocol address of said digital data communication, wherein said mobile telecommunications system number is associated with said Internet Protocol address;
   a home location register for storing location information associated with the wireless client to which the digital data communication is addressed; and
   a signal link connecting the wireless application protocol gateway to the home location register, and wherein said home location register is queried by said wireless application protocol gateway over the signal link for said location information associated with said wireless client, the location information being used to route the wireless application protocol converted digital data communication to the wireless client.

2. The mobile telecommunications system of claim 1, further comprising a base station for allocating a traffic channel to said at least one wireless client for use in delivering the digital data communication.

3. The mobile telecommunications system of claim 2, further comprising a mobile switching center for transmitting a dynamic Internet Protocol address to said wireless application protocol gateway, said dynamic Internet Protocol address associated with said traffic channel.

4. The mobile telecommunications system of claim 3, wherein said wireless application protocol gateway forwards said wireless application protocol converted digital data communication towards said dynamic Internet Protocol address.

5. The mobile telecommunications system of claim 4, wherein said mobile switching center further comprises an InterWorking Function/Direct Access Unit for receiving said digital data communication and transmitting said digital data communication to said wireless client over said traffic channel.

6. In a telecommunications system, a method for transmitting a digital data communication from an Internet server to a wireless client associated with a mobile telecommunications system number, said method comprising the steps of:

receiving a digital data communication associated with an Internet Protocol (IP) address at a wireless application protocol gateway in a certain format, wherein said wireless application protocol gateway comprises:
   a first memory for storing a plurality of static IP addresses, said plurality of IP addresses including said IP address;
   a second memory for storing a plurality of mobile telecommunications system numbers, said plurality of mobile telecommunications system numbers including said mobile telecommunications system number, wherein each of said mobile telecommunications system numbers is associated with a particular one of said plurality of IP addresses; and
   a processor for selecting the mobile telecommunications system number based on the IP address;
converting said certain format of said digital data communication to a wireless application protocol format by said wireless application protocol gateway;
querying a database by said wireless application protocol gateway for location information concerning said wireless client;
allocating a dynamic Internet Protocol address to said wireless client, responsive to said step of querying;
transmitting said dynamic Internet Protocol address from said database to said wireless application gateway; and
transmitting said digital data communications towards said dynamic Internet Protocol address by said wireless application protocol gateway.

7. The method of claim 6, wherein said plurality of mobile telecommunications system numbers including said mobile telecommunications system number is of a type selected from the group consisting of a Mobile Identification Number (MIN) and a Mobile Station Integrated Services Digital Number (MSISDN).

8. The method of claim 6, wherein said step of allocating said dynamic Internet Protocol address further comprises the steps of:
   determining a switching center associated with said wireless client;
   transmitting a routing request from said database to said switching center; and
   transmitting said dynamic Internet Protocol address from said switching center to said database.

9. The method of claim 8, further comprising the step of allocating a traffic channel to said wireless client, responsive to said step of querying.

10. The method of claim 9, further comprising the steps of:
   receiving said digital data communication at said switching center; and
   transmitting said digital data communication to said wireless client on said traffic channel over a wireless air interface.

11. The method of claim 10, wherein said step of receiving said digital data communication at said switching center further comprises the step of:
   receiving said digital data communication at an InterWorking Function/Direct Access Unit.

12. A wireless application protocol gateway for converting an Internet Protocol address associated with a digital data communication to a mobile telecommunications system number associated with a wireless client, said wireless application protocol gateway comprising:
   a first memory for storing a plurality of static Internet Protocol addresses, said plurality of Internet Protocol addresses including said Internet Protocol address associated with said digital data communication;
   a second memory for storing a plurality of mobile telecommunications system numbers, said plurality of mobile telecommunications system numbers including said mobile telecommunications system number associated with said wireless client, and wherein each of said mobile telecommunications system numbers is associated with a particular one of said plurality of Internet Protocol addresses; and
   a processor for selecting a particular mobile telecommunications system number for a particular Internet Protocol address, wherein said particular mobile telecommunications system number is associated with said particular Internet Protocol address.

13. The wireless application protocol gateway of claim 12, wherein said wireless application protocol gateway operates to:
   receive said digital data communication associated with said static Internet Protocol address;
   query a home location register with said particular one of said mobile telecommunications system numbers;
   receive a dynamic Internet Protocol address from said home location register; and
   transmit said digital data communication towards said dynamic Internet Protocol address.

14. The wireless application protocol gateway of claim 12, wherein said plurality of mobile telecommunications system numbers comprises a plurality of mobile services integrated services digital network numbers.

15. The wireless application protocol gateway of claim 12, wherein said plurality of mobile telecommunications system numbers comprises a plurality of mobile identification numbers.

16. A telecommunications system, comprising:
   a mobile telecommunications system supporting a digital data communication associated with a particular Internet Protocol (IP) address with a wireless client associated with a particular mobile telecommunications system number; and
   a gateway comprising:
      a first memory for storing a plurality of static Internet Protocol (IP) addresses, said plurality of IP addresses including said particular IP address;
      a second memory for storing a plurality of mobile telecommunications system numbers, said plurality of mobile telecommunications system numbers including said particular mobile telecommunications system number, and wherein each of said mobile telecommunications system numbers is associated with one of said plurality of IP addresses; and a processor for selecting the particular mobile telecommunications system number for the particular IP address, wherein said particular mobile telecommunications system number is associated with said particular IP address, said gateway interfacing the mobile telecommunications system for communication with a server that originates the digital data communication in a certain format addressed to the wireless client, the gateway operating to query the mobile telecommunications system for a location of the wireless client, converting the digital data communication from the certain format to a wireless format, and sending the digital data communication in the wireless format to the determined location within the mobile telecommunication system for delivery to the wireless client.

17. The telecommunications system of claim 16, wherein said plurality of mobile telecommunications system numbers including said particular mobile telecommunications system number is of a type selected from the group consisting of a Mobile Identification Number (MIN) and a Mobile Station Integrated Services Digital Number (MSISDN).

18. The telecommunications system of claim 16, wherein said mobile telecommunications system further comprises a base station for allocating a traffic channel to said at least one wireless client for use in delivering the digital data communication.

19. The telecommunications system of claim 18, wherein said mobile telecommunications system further comprises a mobile switching center for transmitting a dynamic Internet Protocol address to said wireless application protocol gateway, said dynamic Internet Protocol address associated with said traffic channel.

20. The telecommunications system of claim 19, wherein said gateway forwards said wireless application protocol converted digital data communication towards said dynamic Internet Protocol address.

21. The telecommunications system of claim 20, wherein said mobile switching center further comprises an Inter-Working Function/Direct Access Unit for receiving said digital data communication and transmitting said digital data communication to said wireless client over said traffic channel.

22. A method for gateway operation in delivering a server originated digital data communication associated with a particular Internet Protocol (IP) address and addressed to a wireless client associated with a particular mobile telecommunications system number, the digital data communication having a certain format, wherein said gateway comprises:

a first memory for storing a plurality of static IP addresses including said particular IP address;

a second memory for storing a plurality of mobile telecommunications system numbers including said particular mobile telecommunications system number, wherein each of said mobile telecommunications system numbers is associated with one of said plurality of static IP addresses; and a processor for selecting the particular mobile telecommunications system number for based on the particular Internet Protocol address, said method comprises the steps of:

querying a mobile telecommunications system serving the addressed wireless client for a location of the wireless client;

converting the digital data communication and said Internet Protocol address from the certain format to a wireless format associated with said mobile telecommunication system number; and sending the digital data communication in the wireless format to the determined location within the mobile telecommunications system for delivery to the wireless client.

23. The method of claim 22, wherein said plurality of mobile telecommunications system numbers including said particular mobile telecommunications system number is of a type selected from the group consisting of a Mobile Identification Number (MIN) and a Mobile Station Integrated Services Digital Number (MSISDN).

24. The method of claim 22, wherein said step of querying further comprises the steps of:

receiving a dynamically allocated Internet Protocol address from said mobile telecommunications network.

25. The method of claim 24, wherein said step of sending further comprises the step of sending the digital data communication in the wireless format to the dynamically allocated Internet Protocol address for delivery to the wireless client.

* * * * *